United States Patent [19]
Ticey et al.

[11] Patent Number: 5,669,598
[45] Date of Patent: Sep. 23, 1997

[54] SPRING RETAINER AND ALIGNMENT METHOD

[75] Inventors: Lester Ticey, Gilbert; Peter Schneider, Mesa; Jim Leonhardt, Gilbert, all of Ariz.

[73] Assignee: Motorola, Inc., Schaumburg, Ill.

[21] Appl. No.: 786,350

[22] Filed: Jan. 23, 1997

Related U.S. Application Data

[63] Continuation of Ser. No. 581,799, Jan. 2, 1996, abandoned.
[51] Int. Cl.$^6$ ........................................... F16F 1/20
[52] U.S. Cl. ................................. 267/162; 425/410
[58] Field of Search ............................ 267/161, 162; 425/406, 410

[56] References Cited

U.S. PATENT DOCUMENTS

| 2,655,935 | 10/1953 | Kinzbach | 267/162 X |
| 2,912,564 | 11/1959 | Deffenbaugh et al. | 267/162 |

FOREIGN PATENT DOCUMENTS

| 293149 | 4/1971 | U.S.S.R. | 267/162 |
| 1174629 | 8/1985 | U.S.S.R. | 267/162 |

*Primary Examiner*—Lee W. Young
*Attorney, Agent, or Firm*—Gary W. Hoshizaki; Robert D. Atkins

[57] ABSTRACT

A method for maintaining alignment of a stack of spring washers mounted on a shaft. A retainer (44) is provided with an opening (41) for mounting on a shaft (49), a planar surface (42) for contacting outer contact edge (46) of spring washer (47) and a retaining lip (43) for limiting the lateral movement of spring washer (47).

17 Claims, 4 Drawing Sheets

5,669,598

SPRING RETAINER AND ALIGNMENT METHOD

This application is a continuation of prior application Ser. No. 08/581,799, filed Jan. 2, 1996, now abandoned.

BACKGROUND OF THE INVENTION

This invention relates generally to spring mechanisms, and more particularly, to high reliability spring mechanisms.

Springs are commonly used to convert an input displacing force to an output compressive force whose magnitude can be predicted and controlled. For example, in injection molding systems, such as those commonly used to encapsulate semiconductor devices, spring washers are stacked on a shaft connected to a plunger which compacts thermoset plastic material into a mold. The number of spring washers in the stack and their configuration determines the output compressive force, which must be consistent with each compacting cycle to insure proper distribution of the plastic material in the mold.

One problem inherent in the conventional plunger mechanism described above is its susceptibility to premature wearing of the spring washers as they repeatedly rub against the shaft during each compression cycle. The wearing increases a spring washer's lateral movement relative to the shaft, which causes stack misalignment, accelerates the rate of wear and undesirably alters the stack's compression characteristics. The result is increased maintenance down time, out-of-specification compaction of the plastic material, and possible contamination of the plastic molding material by metal particles abraded from the spring washers dropping into the mold cavity.

It would be a benefit if a spring could be provided that reduces wear in a plunger mechanism in order to enhance reliability and reduce contamination.

DETAILED DESCRIPTION OF THE DRAWINGS

In a typical injection molding system, a plurality of spring washers are stacked on a shaft connected to a plunger for compacting thermoset plastic material which has been preloaded into a mold. Spring washers are similar in appearance to flat washers, but have spring characteristics due to the fact that they are beveled. A hydraulic system displaces the input end of the spring washer stack and as the plunger encounters resistance from the compacting plastic material the spring washers compress and transfer to the plastic material the desired compressive force for compaction.

Target specifications for the molded plastic material are often demanding, particularly in an integrated circuit package molding application. The specifications can only be met if a predictable and consistent compressive force is applied to compact the plastic material. Insufficient compacting results in nonuniformities, voids, or excessive porosity of the compacted material. Too high a compressive force, on the other hand, squeezes plastic material out of the mold, again producing voids, or elevates the plastic material's temperature beyond what is desirable for proper curing.

Narrow uniformity and reliability standards required for integrated circuit packaging impose strict tolerances on the output compressive force and make the conventional plunger mechanism susceptible to quality problems associated with alignment of the spring washer stack. The repeated sliding of the spring washers against the shaft combined with high compressive forces on the order of 2,000 p.s.i. required for compacting the plastic material cause premature wearing of the spring washers.

In practice, preventative maintenance measures have limited value because friction-related failures have occurred at any time without advance warning. Seizing of the stack after only a few days of operation has been observed. Moreover, these failures are often detectable only after the thermoset plastic material has been compressed or cured, so that during the fabrication process the quality of fabricated packages remains doubtful. These problems are particularly serious when the likely result of a defect in a molding system is the loss of a relatively expensive encapsulated microchip.

Figure 1:
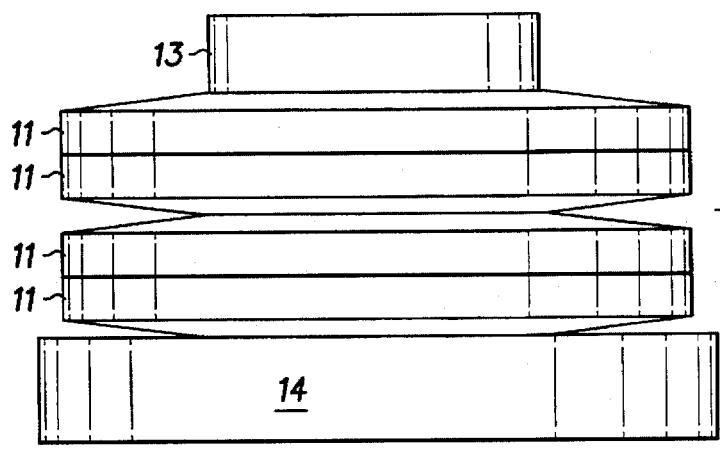
FIG. 1 is a side view of a portion of an enlarged uncompressed plunger mechanism in accordance with the prior art.

FIG. 1 is a side view of a conventional plunger configuration in the unloaded state. FIG. 1 represents current practice as typically implemented in an injection molding machine for the manufacture of integrated circuit packages. Shaft 13 has a flange 14 against which are stacked one or more spring washers 11. Belleville type spring washers are commonly utilized in plunger mechanisms because they are inexpensive, widely available, and well suited to handle high loads in small spaces. They can be stacked in various easily modified configurations as needed to accommodate numerous load carrying requirements. A spring washer is made of some flexible material such as commercial spring steel or type 17-7 stainless steel. In the configuration shown in FIG. 1, four spring washers 11 are arranged as two pairwise opposing sets. FIG. 1 shows the stack of spring washers 11 in a no load, or uncompressed, state.

Figure 2:
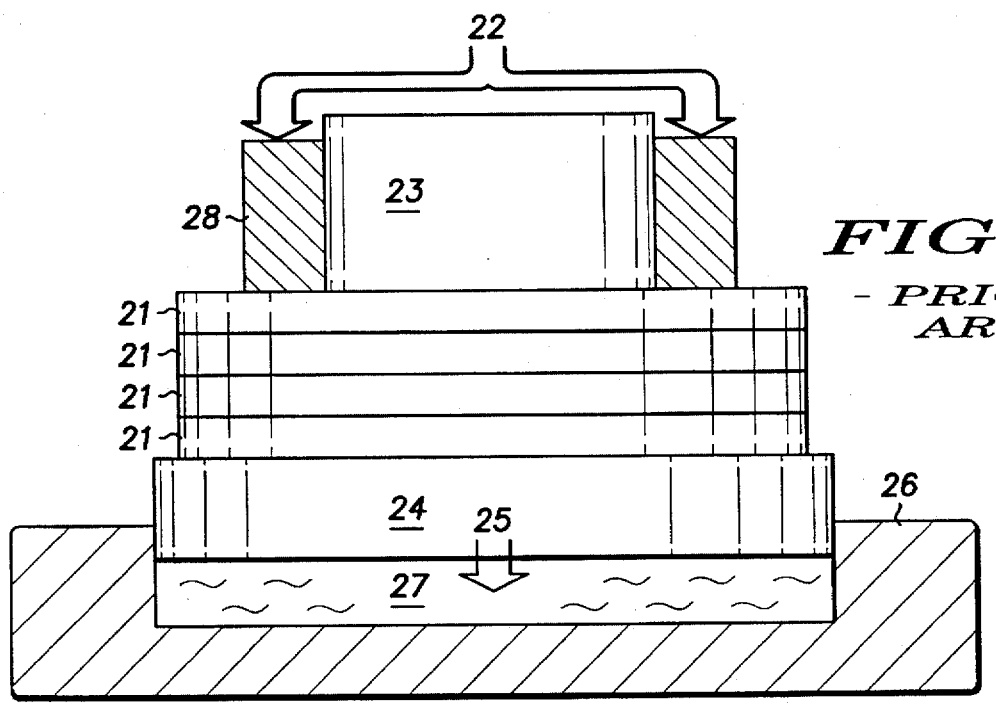
FIG. 2 is an enlarged cross-sectional view of a prior art plunger mechanism showing flattening of the spring washers when a compressive force is applied.

FIG. 2 is an enlarged cross-sectional view of a plunger mechanism showing a stack of spring washers 21 in a compressed state. After thermoset plastic material 27 has been preloaded in mold sleeve 26, a hydraulic mechanism applies an input displacing force 22 against the top of the spring washer stack by means of sleeve 28 or its equivalent, displacing the top of the stack by some fixed amount. Displacing force 22 is coupled through the stack to flange 24 which is connected to shaft 23. As flange 24 compacts plastic material 27, flange 24 encounters resistance causing the spring washers 21 to be compressed. The resulting output compressive force 25 is then applied to plastic material 27. The amount of compressive force 25 is easily modified by changing the number or configuration of spring washers 21 in the stack.

Figure 3:
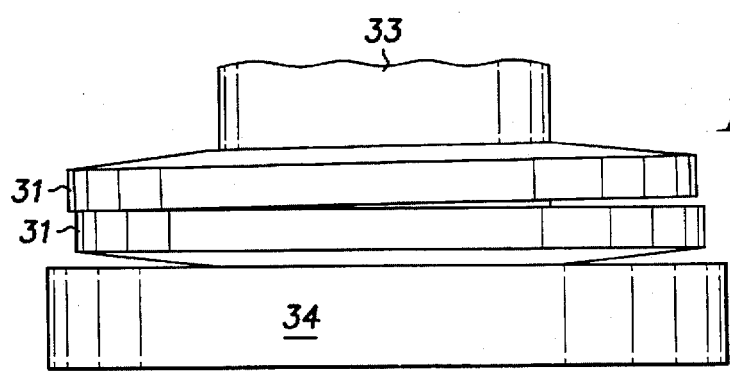
FIG. 3 is a side view of an enlarged portion of a prior art plunger mechanism showing misalignment of the spring washers.

FIG. 3 is a side view of an enlarged portion of a plunger mechanism showing misalignment of adjacent spring washers 31 in the stack. The misalignment occurs when the center holes of the spring washers 31 wear in response to sliding against shaft 33 during repeated compression cycles. Misalignment of spring washers 31 introduces an undesirable lateral force that presses a spring washer 31 into shaft 33, which accelerates the wearing of spring washer 31 and often results in the stack binding against shaft 33. Even if binding does not occur, the pressure applied across the outer contact edge of each spring washer 31 can alter the spring characteristic from its expected value. Moreover, abraded particles are available to drop into the mold sleeve and contaminate the thermoset plastic material.

Figure 4:
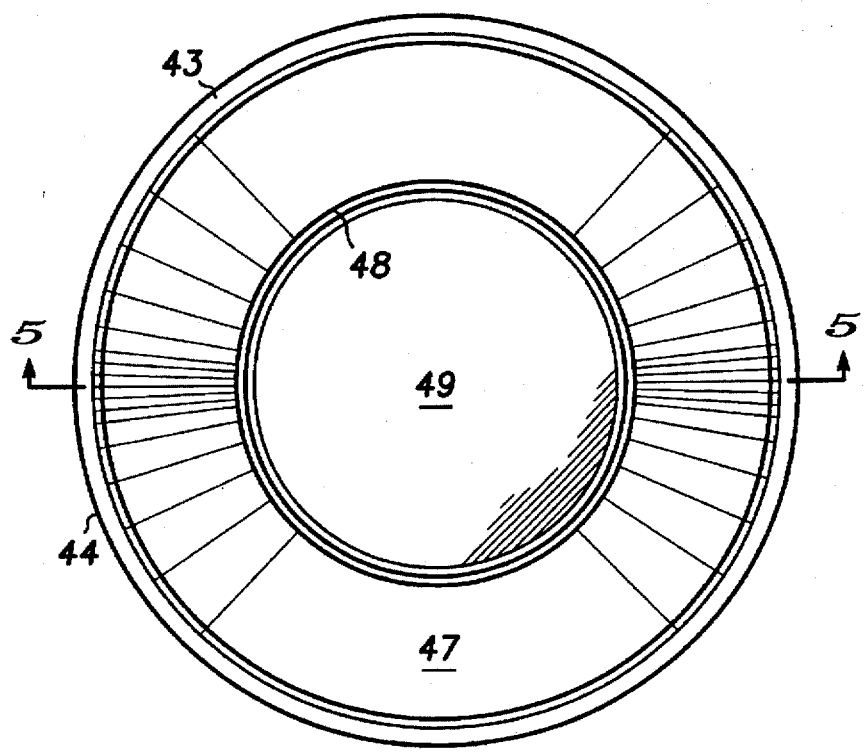
FIG. 4 is an enlarged top view of a single-sided retainer and the positioning of a spring washer on the retaining side in accordance with the present invention.
Figure 5:
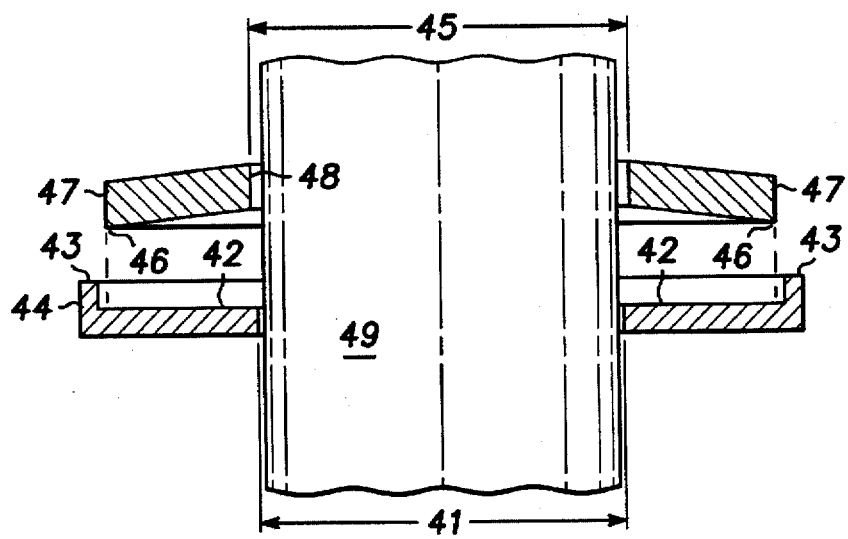
FIG. 5 is an enlarged cross-sectional view of a portion of a single-sided retainer and the positioning of a spring washer on the retaining side in accordance with the present invention.

FIG. 4 is an enlarged top view of an uncompressed spring assembly consisting of spring washer 47 aligned with single sided retainer 44 and stacked on shaft 49. FIG. 5 is an enlarged cross-sectional view of an uncompressed spring assembly consisting of spring washer 47 aligned with single-sided retainer 44 and stacked on shaft 49. Retainer 44 has a planar surface 42, against which is positioned outer contact edge 46 of spring washer 47. Retainer 44 includes a retaining lip 43 which circumscribes planar surface 42. Retaining lip 43 is designed to contain the lateral movement of spring washer 47 and should be elevated from planar surface 42 by an amount roughly comparable to the thickness of the metal stock of spring washer 47. It has been found that an elevation of 0.030" was sufficient to contain a spring washer's lateral movement. However, it will be apparent to one skilled in the art that the elevation of retaining lip 43 may be varied.

Figure 6:
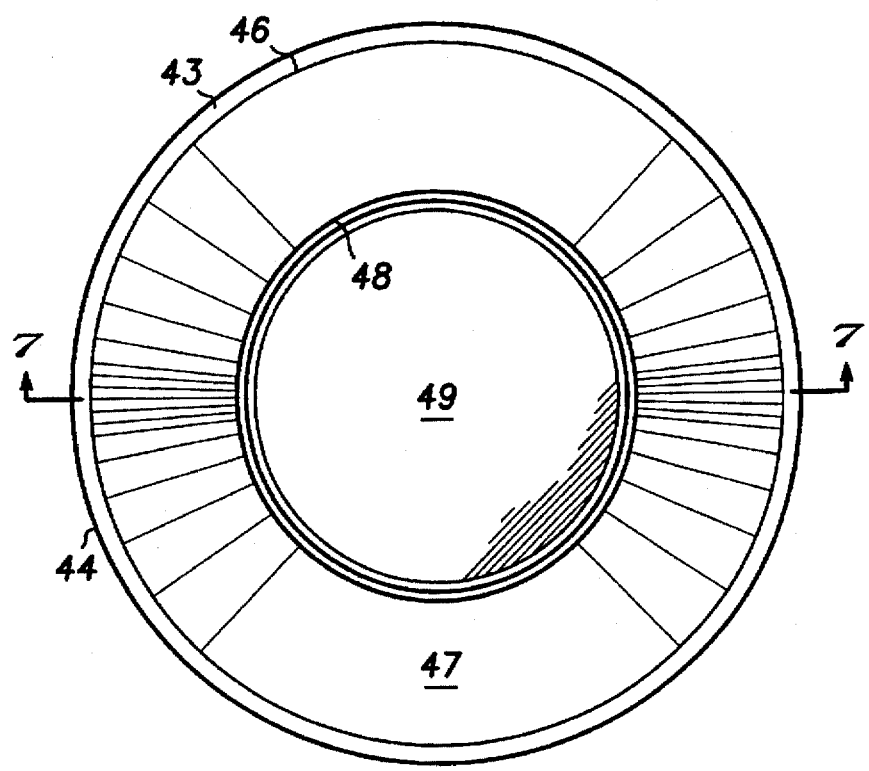
FIG. 6 is an enlarged top view of a single-sided retainer and fully compressed spring washer in accordance with the present invention.
Figure 7:
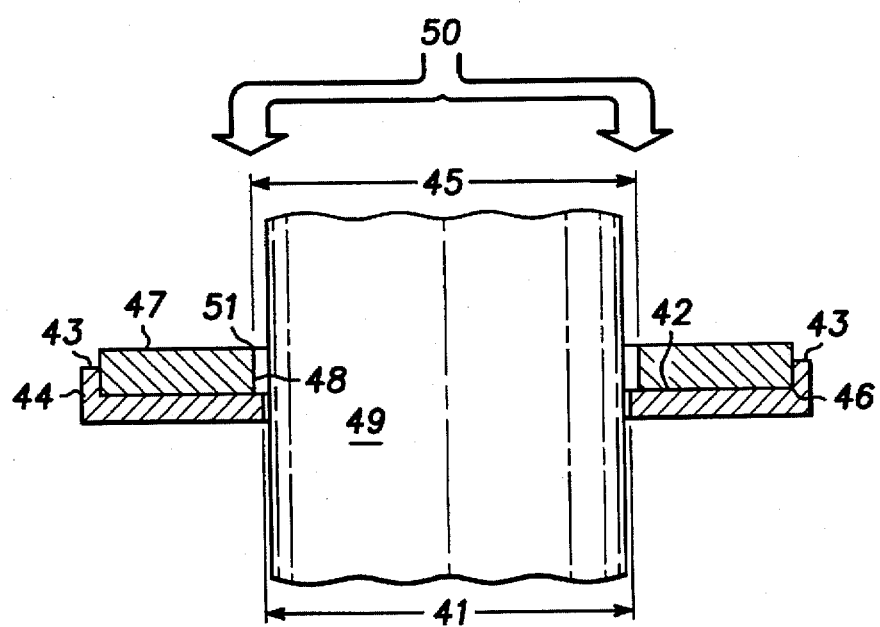
FIG. 7 is an enlarged cross-sectional view of a retainer and fully compressed spring washer in accordance with the present invention.

FIG. 6 is an enlarged top view of single-sided retainer 44 and fully compressed spring washer 47. FIG. 7 is an enlarged cross-sectional view of single-sided retainer 44 and fully compressed spring washer 47. Note that when compressive force 50 applied to inner contact surface 51 of spring washer 47 is sufficient to fully compress spring washer 47, outer contact edge 46 of spring washer 47 just comes into contact with retaining lip 43. This is in contrast with the uncompressed spring washer as shown in FIGS. 4 and 5, wherein there is a gap between outer contact edge 46 of spring washer 47 and retaining lip 43.

Even though it is theoretically possible to tailor the transfer characteristics of the stack by changing the gap between outer contact edge 46 and retaining lip 43, it has been found to be optimumto provide just enough clearance so that outer contact edge 46 just contacts retaining lip 43 as spring washer 47 reaches full compression, as shown in FIGS. 6 and 7. With the particular spring washers used in one embodiment a gap of 0.0015" between uncompressed outer contact edge 46 and retaining lip 43 achieved satisfactory results.

Opening 41 of retainer 44 is smaller in diameter than center hole 45 of spring washer 47 so that under worst case alignment and compression conditions spring washer 47 should not come into contact with shaft 49. Therefore, retainer 44 can be constructed from a material with low friction properties, such as an anti-seizing aluminum-bronze alloy.

Figure 8:
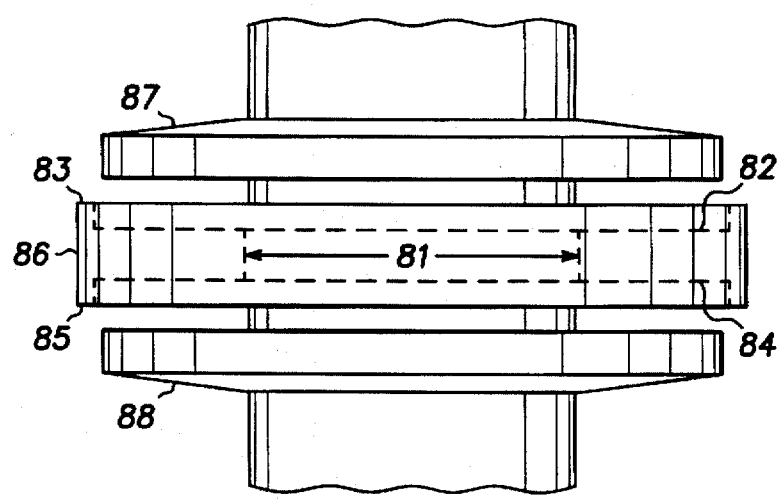
FIG. 8 is an enlarged side view of a double-sided retainer and its associated spring washers in accordance with the present invention.

FIG. 8 is an enlarged side view of a spring assembly consisting of double-sided retainer 86 along with oppositely oriented spring washers 87 and 88. It is often desirable to configure such a single retainer to limit the lateral movement two spring washers, one on either side of the retainer. Note that opening 81, first planar surface 82 and first retaining lip 83 of retainer 86 have the same characteristics as center hole 44, planar surface 42 and retaining lip 43 of retainer 44 as shown in FIGS. 4 and 5. Second planar surface 84 and second retaining lip 85 are designed to accept second spring washer 88 subject to the same considerations as for first planar surface 82, first retaining lip 83 and spring washer 87, respectively.

Figure 9:
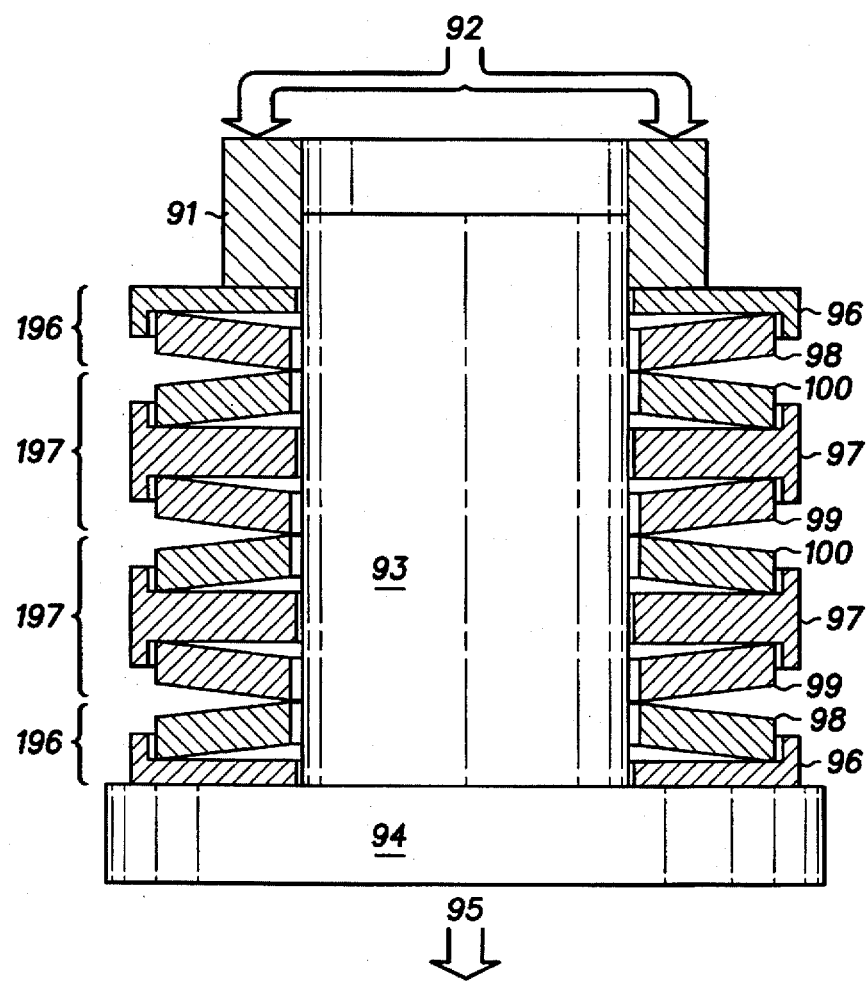
FIG. 9 is an enlarged cross-sectional view of a portion of a plunger mechanism employing retainers to control the alignment of the spring washers in accordance with the present invention.

FIG. 9 is an enlarged cross-sectional view of a representative plunger mechanism utilizing the retainer invention. A plurality of spring assemblies 196 and 197 are stacked on shaft 93. Spring assemblies 196, comprised of single-sided retainer 96 and spring washer 98, are used at the top and bottom of the stack. Spring assemblies 197, comprised of double-sided retainer 97 and associated spring washers 100 and 99 are used for the remainder of the stack. For clarity, spring washers 98, 99 and 100 are shown in the uncompressed state. Shaft 93, flange 94, sleeve 91, input displacing force 92 and output compressive force 95 correspond to shaft 23, flange 24, sleeve 28, input displacing force 22 and output compressive force 25, respectively, in FIG. 2.

Spring assemblies 196 and 197 slide along shaft 93 in response to input displacing force 92 being applied to the top of the stack, thereby determining the magnitude of output compressive force 95. Retainers 96 and 97 are designed to contact shaft 93, but spring washers 98, 99 and 100 are prevented from doing so by the motion limiting effect of retainers 96 and 97. One skilled in the art will be able to modify the desired output compressive force by varying the configuration of spring assemblies in the stack. If retainers 96 and 97 are made from a low friction, anti-seizing material, friction and wearing will be greatly reduced.

By now it should be appreciated that the present invention provides a method for increasing the reliability of a plunger mechanism using spring washers mounted on a shaft in an application requiring consistent compression forces. Alignment of the spring washers is maintained by providing a surface for contacting their outer contact edges and limiting their lateral motion to keep them from coming into contact with the shaft.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. An injection molding apparatus for forming an integrated circuit package, comprising:

a shaft;

a first spring washer having an outer contact edge and an opening for moving along the shaft; and a retainer having an opening less in diameter than the opening of the first spring washer for slidably mounting on the shaft, wherein the first spring washer is disposed on a first planar surface of the retainer extending from the opening of the retainer to a first retaining lip, the first retaining lip is greater in diameter than the outer contact edge of the first spring washer when the first spring washer is uncompressed, and the first retaining lip restricts movement of the first spring washer on the first planar surface to avoid contact between the first spring washer and the shaft.

2. The injection molding apparatus of claim 1, wherein the outer contact edge of the first spring washer expands to the diameter of the first retaining lip when the first spring washer is compressed.

3. The injection molding apparatus of claim 1, wherein the first planar surface restricts the first spring washer from compressing past the first planar surface.

4. The injection molding apparatus of claim 3, further comprising a second spring washer having an outer contact edge and an opening greater in diameter than the opening of the retainer for moving along the shaft.

5. The injection molding apparatus of claim 1, wherein the second spring washer is disposed on a second planar surface of the retainer extending from the opening of the retainer to a second retaining lip, the second retaining lip is greater in diameter than the outer contact edge of the second spring washer when the second spring washer is uncompressed, and the second retaining lip restricts movement of the second spring washer on the second planar surface to avoid contact between the second spring washer and the shaft.

6. The injection molding apparatus of claim 5, wherein the outer contact edge of the second spring washer expands to the diameter of the second retaining lip when the second spring washer is compressed.

7. The injection molding apparatus of claim 6, wherein the second spring washer is restricted from compressing past the second planar surface.

8. The injection molding apparatus of claim 7, wherein the integrated circuit package is formed from a moldable material, further comprising:

a mold sleeve for depositing the moldable material; and a flange connected to a first end of the shaft for compacting the moldable material in the mold sleeve.

9. The injection molding apparatus of claim 1, wherein the retainer comprises an anti-seizing, low friction material.

10. An injection molding apparatus for compacting a moldable material to form an integrated circuit package, comprising:

a shaft;

a spring washer having an outer contact edge and an opening for moving along the shaft;

a retainer having an opening less in diameter than the opening of the spring washer for slidably mounting on the shaft, wherein the spring washer is disposed on a planar surface of the retainer extending from the opening of the retainer to a retaining lip, the retaining lip is greater in diameter than the outer contact edge of the spring washer when the spring washer is uncompressed, and the retaining lip restricts movement of the spring washer on the planar surface to avoid contact between the spring washer and the shaft; and a mold sleeve for receiving the moldable material.

11. The injection molding apparatus of claim 10, further comprising a flange connected to a first end of the shaft for compacting the moldable material in the mold sleeve.

12. The injection molding apparatus of claim 10, wherein the planar surface of the retainer restricts the spring washer from compressing past the planar surface.

13. A method of forming an integrated circuit package, comprising the steps of:

slidably mounting a spring washer along a shaft through an opening in the spring washer;

disposing the spring washer against a retainer, the retainer having an opening less in diameter than the opening in the spring washer for slidably mounting on the shaft, wherein the spring washer is disposed on a planar surface of the retainer extending from the opening of the retainer to a retaining lip, the retaining lip is greater in diameter than the outer edge of the spring washer when the spring washer is uncompressed, and the retaining lid restricts movement of the spring washer on the planar surface to avoid contact between the spring washer and the shaft.

14. The method of claim 13, further comprising a step of compressing the spring washer.

15. The method of claim 14, wherein the step of compressing the spring washer includes a step of restricting the spring washer from compressing past the planar surface.

16. The method of claim 15, wherein the integrated circuit package comprises a moldable material and the step of compressing the spring washer further includes a step of compacting the moldable material into a mold sleeve.

17. The method of claim 10, further comprising a step of inserting the moldable material into the mold sleeve.

* * * * *

UNITED STATES PATENT AND TRADEMARK OFFICE
CERTIFICATE OF CORRECTION

PATENT NO. : 5,669,598  
DATED : September 23, 1997  
INVENTOR(S) : Les Ticey et al.

Page 1 of 1

It is certified that error appears in the above-identified patent and that said Letters Patent is hereby corrected as shown below:

Column 6,  
Line 41, delete "10" and add -- 16 --.

Signed and Sealed this

Fourteenth Day of May, 2002

Attest:

JAMES E. ROGAN  
*Attesting Officer*  *Director of the United States Patent and Trademark Office*